(12) United States Patent
Eglip et al.

(10) Patent No.: US 11,602,005 B2
(45) Date of Patent: Mar. 7, 2023

(54) ENHANCED NAMF INTERFACE TO SUPPORT RADIO RESOURCE CONTROL INACTIVE STATE

(71) Applicant: Verizon Patent and Licensing Inc., Basking Ridge, NJ (US)

(72) Inventors: Helen Osias Eglip, Sammamish, WA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

(21) Appl. No.: 17/202,837

(22) Filed: Mar. 16, 2021

(65) Prior Publication Data
US 2022/0304098 A1  Sep. 22, 2022

(51) Int. Cl.
*H04W 76/27* (2018.01)
*H04W 76/16* (2018.01)

(52) U.S. Cl.
CPC .......... *H04W 76/27* (2018.02); *H04W 76/16* (2018.02)

(58) Field of Classification Search
CPC ....... H04W 76/27; H04W 76/16; Y02D 30/70
See application file for complete search history.

(56) References Cited

U.S. PATENT DOCUMENTS

2008/0090583 A1\* 4/2008 Wang ................. H04W 72/121
714/751

FOREIGN PATENT DOCUMENTS

CN  109673061 A  \*  4/2019
WO  WO-2021244762 A1  \*  12/2021

\* cited by examiner

*Primary Examiner* — Farid Seyedvosoghi

(57) ABSTRACT

An improved cellular network architecture enables the distribution of Radio Resource Control (RRC) inactive state to devices in a core network. A mobility manager receives subscription requests from core network devices requesting notification of user equipment (UE) transitions to RRC Inactive states. Upon receiving an RRC transition report for a UE that indicates a transition to an RRC Inactive state, the mobility manager publishes an event including data representing the RRC inactive state and a UE identifier. Subscribing network elements receive this event and can adjust operations accordingly, including temporarily suspending operations until a further RRC state change.

20 Claims, 6 Drawing Sheets

ENHANCED NAMF INTERFACE TO SUPPORT RADIO RESOURCE CONTROL INACTIVE STATE

BACKGROUND INFORMATION

User equipment (UE) in a 5G network transitions between various states including connected, idle, and inactive states. In the connected and idle states, the UE is registered and de-registered, respectively, from the cellular network. In the inactive state, the UE is registered with the cellular network and the radio access network (RAN) maintains a context for the UE to resume operations.

DETAILED DESCRIPTION OF EXAMPLE EMBODIMENTS

Figure 1:
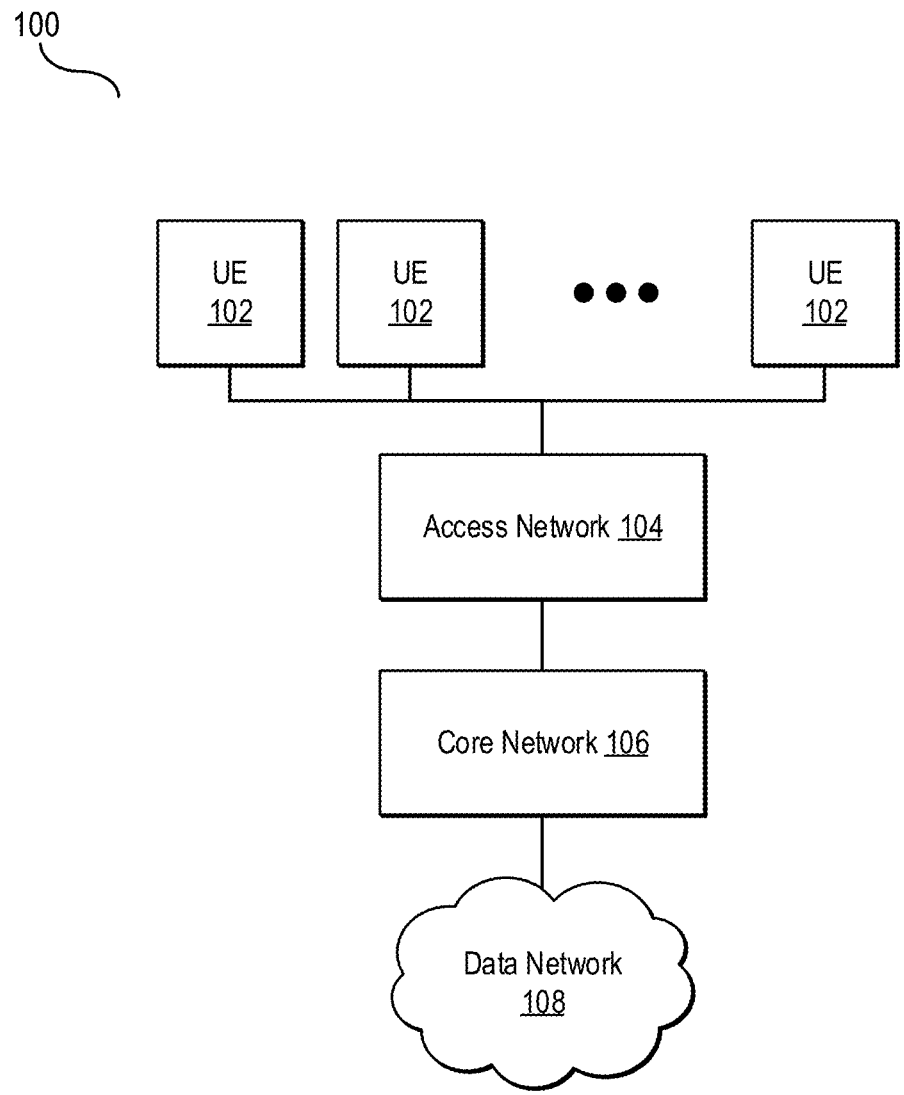
FIG. 1 is a block diagram of a cellular network according to some embodiments of the disclosure.

In dual-connectivity (DC) cellular networks, a UE may simultaneously be connected to two base stations. For example, in a New Radio Dual Connectivity (NR-DR) configuration, a UE may be communicatively coupled to a two 5G gNodeB base stations, as a master node and a secondary node. In this scenario, in some embodiments, the UE may utilize the master gNodeB for control data while using the secondary gNodeB for user data.

When a 5G UE is inactive, the UE may enter a Radio Resource Control (RRC) Inactive state whereby radio communication may be effectively terminated between the UE and RAN until the UE requests re-attachment. In some networks, the mobility manager may terminate DC upon detecting that a UE is in an RRC Inactive state. However, in current cellular networks, there is no mechanism for allowing other core network devices (e.g., session managers, policy managers, etc.) to adjust operations based on this RRC Inactive detection. Thus, while the mobility manager and RAN can adjust their operations based on the RRC Inactive detection, other components of the core network operate as if the UE is still in an RRC Connected state, which wastes network resources. The disclosed embodiments provide a mechanism for allowing a core network element to adjust operations based on this RRC Inactive state transition.

The disclosed embodiments may modify a mobility manager to receive subscription requests from core network devices requesting notification of UE transitions to RRC Inactive states. Upon receiving an RRC transition report for a UE that indicates a transition to an RRC Inactive state, the mobility manager publishes an event including data representing the RRC inactive state and a UE identifier. Subscribing network elements receive this event and can adjust operations accordingly, including temporarily suspending operations until a further RRC state change.

More specifically, methods, computer-readable media, devices, and systems are disclosed that operate to receive subscription requests from other core network devices (e.g., a session manager). In the illustrated embodiments, the session request includes an RRC inactive state status subscription type. The embodiments establish a mapping between core network devices and UE identifiers included in the subscription requests. The embodiments receive a transition report indicating that a given UE has entered an RRC inactive state. In response, the embodiments generate an event responsive to the transition report. This event may include data representing the RRC inactive state as well as an identifier of the UE. The embodiments query the mapping and publish the event to all subscribed core network devices.

In some embodiments, the subscription requests are received from a gateway device, such as a Session Management Function (SMF) in a 5G network. In some embodiments, the subscriptions are managed by a mobility manager, such as an Access and Mobility Management Function (AMF). In these embodiments, the AMF may receive the subscription requests over a defined interface such as a Namf interface. Further, the subscription requests may be received when a core network device issues a request to a Namf_EventExposure service. In some embodiments, to receive the transition report, the embodiments further include issuing a context request to a base station prior to receiving the transition report, the context request comprising a request to be notified of RRC state changes. This context may comprise either an initial context setup request or a context modification request. In some embodiments, publishing the event to the core network device may include transmitting the event to one or more of a Network Exposure Function (NEF), Policy Control Function (PCF), Unified Data Management (UDM) Function, SMF, or another AMF.

FIG. 1 is a block diagram of a cellular network according to some embodiments of the disclosure.

As seen in FIG. 1, a system (100) includes UE (102) that accesses a data network (108) via an access network (104) and a core network (106). In the illustrated embodiment, UE (102) comprises any computing device capable of communicating with the access network (104). As examples, UE (102) may include mobile phones, smart phones, tablets, laptops, sensors, Internet of Things (IoT) devices, and any other devices equipped with a cellular transceiver. One example of a UE is provided in FIG. 6.

In the illustrated embodiment, the access network (104) comprises a network allowing over-the-air network communication with UE (102). In general, the access network (104) includes at least one base station that is communicatively coupled to the core network (106) and wirelessly coupled to zero or more UE (102).

In one embodiment, the access network (104) comprises a fifth-generation (5G) cellular access network. In one embodiment, the access network (104) and UE (102) comprise a NextGen Radio Access Network (NG-RAN). In an embodiment, the access network (104) includes a plurality of next Generation Node B (gNodeB) base stations connected to UE (102) via an air interface. In one embodiment, the air interface comprises a New Radio (NR) air interface. In some embodiments, an NR interface utilizes a cyclic prefix orthogonal frequency-division multiple access (CP-OFDM) downlink modulation scheme and either CP-OFDM or discrete Fourier transform spread orthogonal frequency division multiplexing (DFT-s-OFDM) uplink modulation scheme. In these embodiments, the gNodeB provides all functionality to implement and operate the air interface and negotiates uplinks and downlinks with the UE (102). The gNodeB may additionally include multiple network interfaces for communicating with the core network (106). In one embodiment, the gNodeB includes an interface to communicate with a mobility manager (e.g., an AMF) and a second interface to communicate with one or more gateway elements in the core network (106) such as a SMF for control data or a User Plane Function (UPF) for user data. In one embodiment, the mobility manager manages control plane traffic while the gateway elements manage user data traffic, as will be discussed. In some embodiments, base stations in the access network (104) are communicatively connected. For example, in a 5G network, individual gNodeB devices can be communicatively coupled via an X2 interface.

In one embodiment, the access network (104) comprises a fourth-generation (4G) cellular access network. In some embodiments, the access network (104) comprises an LTE access network. In one embodiment, the access network (104) and UE (102) comprise an Evolved Universal Mobile Telecommunications System (UMTS) Terrestrial Radio Access Network (E-UTRAN). In an embodiment, the access network (104) includes a plurality of Evolved Node B (eNodeB) base stations connected to UE (102) via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE (102). The eNodeB may additionally include multiple network interfaces for communicating with the core network (106). In one embodiment, the eNodeB includes an interface to communicate with a mobility manager (e.g., a Mobility Management Entity, MME) and a second interface to communicate with one or more gateway elements in the core network (106) such as a Serving Gateway (S-GW) or Packet Data Network Gateway (P-GW). In one embodiment, the mobility manager manages control plane traffic while the gateway elements manage user data traffic, as will be discussed. In some embodiments, base stations in the access network (104) are communicatively connected. For example, in a 4G network, individual eNodeB devices can be communicatively coupled, for example via an X2 interface or any other interface.

In some embodiments, the access network (104) may operate in a dual-connectivity mode wherein a single UE (102) connects to multiple base stations in the access network (104) simultaneously. In some embodiments, dual connectivity may be implemented via New Radio Dual Connectivity (NR-DR), E-UTRA-NR Dual Connectivity (EN-DC), NG-RAN-E-UTRA-NR Dual Connectivity (NGEN-DC), or NR-E-UTRA Dual Connectivity (NE-DC).

In the illustrated embodiment, the access network (104) provides access to a core network (106) to the UE (102). In the illustrated embodiment, the core network may be owned and/or operated by a mobile network operator (MNO) and provides wireless connectivity to UE (102). In the illustrated embodiment, this connectivity may comprise voice and data services. The core network (106) includes various computing devices, which are described briefly herein. Further detail of such devices is provided in FIG. 2.

At a high-level, the core network (106) may include a user plane and a control plane. In one embodiment, the control plane comprises network elements and communications interfaces to allow for the management of user connections and sessions. By contrast, the user plane may comprise network elements and communications interfaces to transmit user data from UE (102) to elements of the core network (106) and to external network-attached elements in a data network (108) such as the Internet. An example of a control plane function comprises authenticating that a user can access the core network (106) (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network (106) may include a mobility manager, one or more gateways (e.g., a serving gateway and packet gateway), and a subscriber database. In practice, the core network (106) may include more components than these. In a 4G network, the mobility manager may be implemented by an MME, the serving gateway by an S-GW, the packet gateway by a P-GW, and the subscriber database by a home subscriber server (HSS). In a 5G network, the mobility manager may be implemented by an AMF, SMF, and an Authentication Server Function (AUSF). Specifically, the AMF performs mobility management while the SMF performs session management, both of which are described herein. Further, the AUSF obtains authentication vectors from a subscriber database. In a 4G network, the MME performs all of these functions. The serving gateway in a 5G network may be implemented by the SMF as well. Specifically, packet routing from the base station to the packet gateway may be handled by the SMF in contrast to the S-GW in a 4G network. In a 5G network, the packet gateway may be implemented by the UPF, which provides packet routing from the serving gateway to external services and manages Internet Protocol (IP) address allocation as well as content filtering and blocking. In a 5G network, the subscriber database may be implemented by a Unified Data Repository (UDR), which stores the subscriber data. Access to the UDR may be mediated by Unified Data Management (UDM), which is part of the subscriber database, as described herein.

In brief, a UE (102) communicates with the mobility manager to authenticate and establish a session or bearer with the serving and packet gateways. The mobility manager accesses the subscriber data to confirm the UE (102) identity and communicates with the serving gateway to establish the session. Once established, the UE (102) transmits data requests through the session to the packet gateway, which manages the transmitting and receiving data to and from external network services. Specific details of these elements are provided in the following figures.

In the illustrated embodiment, the access network (104) and the core network (106) are operated by an MNO. However, in some embodiments, the networks (104, 106) may be operated by a private entity and may be closed to public traffic. For example, the components of the network (106) may be provided as a single device, and the access network (104) may comprise a small form-factor base station. In these embodiments, the operator of the device can simulate a cellular network, and UE (102) can connect to this network similar to connecting to a national or regional network. Further details on this implementation are described more fully in the description of FIG. 2.

Figure 2:
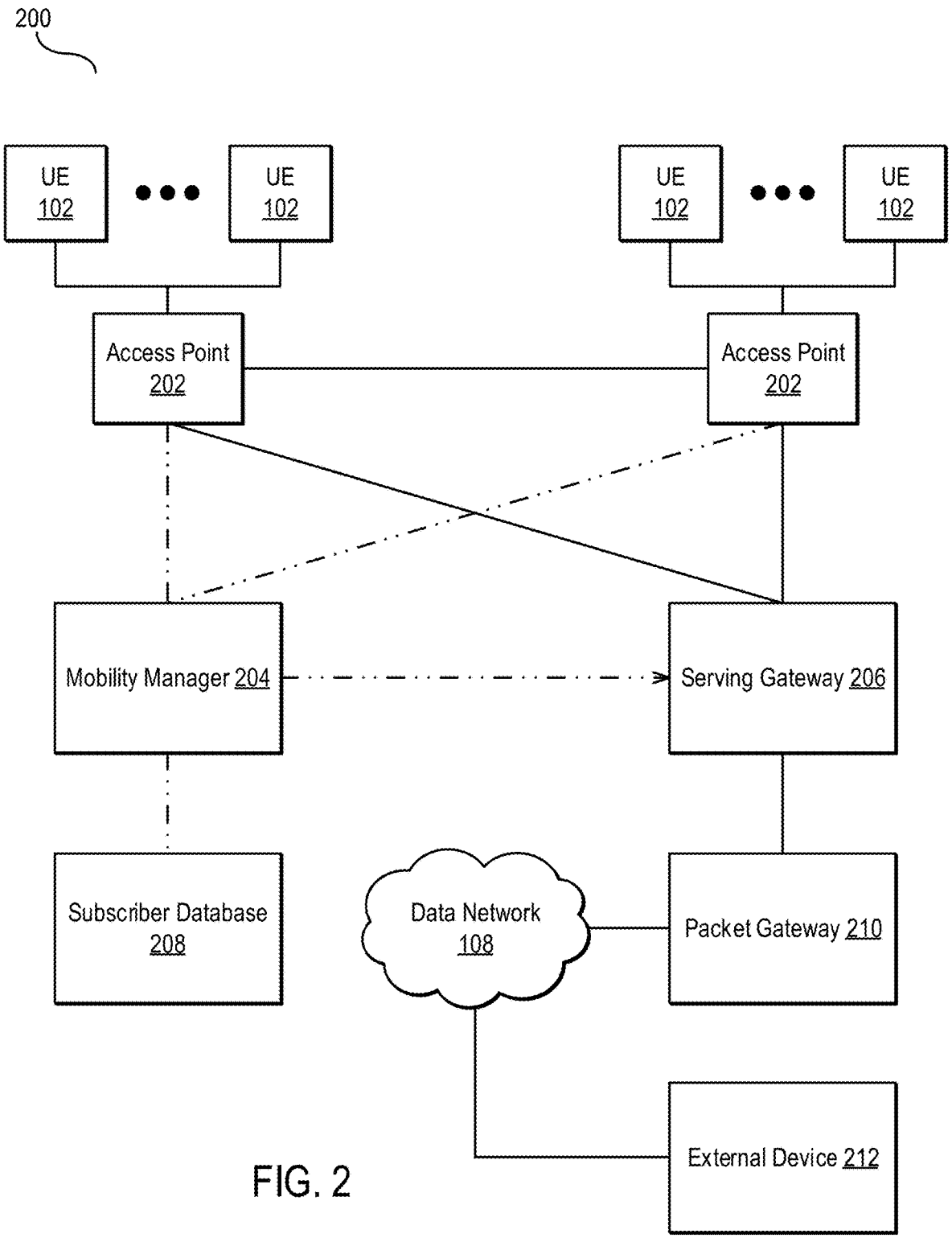
FIG. 2 is a block diagram illustrating a cellular network according to some embodiments of the disclosure.

FIG. 2 is a block diagram illustrating a cellular network according to some embodiments of the disclosure.

In the illustrated embodiment, a system (200) includes UE (102) communicatively connected to access points (202). As seen in FIG. 2, the access points (202) form an access network such as a network (104). In one embodiment, the access points (202) and UE (102) comprise a NextGen Radio Access Network (NG-RAN). In an embodiment, the access points (202) comprise a plurality of gNodeB base stations connected to UE (102) via an air interface. In one embodiment, the air interface comprises a New Radio (NR) air interface. The gNodeB additionally includes multiple network interfaces for communicating with the core network and, specifically, mobility manager (204) and serving gateway (206). In one embodiment, the mobility manager (204) in a 5G network comprises an AMF. In one embodiment, the serving gateway (206) comprises an SMF for control data or UPF for user data.

In another embodiment, the access points (202) comprise eNodeB base stations connected to UE (102) via an air interface. In these embodiments, the eNodeB provides all functionality to implement and operate the air interface and negotiates uplinks and downlinks with the UE (102). The eNodeB additionally includes multiple network interfaces for communicating with the core network and, specifically, mobility manager (204) and serving gateway (206). In one embodiment, the mobility manager (204) comprises an MME in a 4G network. In the illustrated embodiment, solid lines between network elements (204, 206, 208, and 210) represent user data traffic while dashed lines between network elements (204, 206, 208, and 210) represent control or non-access stratum (NAS) traffic.

In the illustrated embodiment, the mobility manager (204) manages control plane traffic while the gateway elements (206, 210) manage user data traffic. Specifically, the mobility manager (204) may comprise hardware or software for handling network attachment requests from UE (102). As part of processing these requests, the mobility manager (204) accesses a subscriber database (208). The subscriber database (208) comprises hardware or software that stores user authorization and authentication data and validates users to the network. In some embodiments, the subscriber database (208) may comprise a UDM and UDR in a 5G network. In another embodiment, the subscriber database (208) may comprise an HSS in a 4G network. In one embodiment, the subscriber database (208) may also store a location of the user updated via a Diameter or similar protocol.

The mobility manager (204) may also be configured to create data sessions or bearers between UE (102) and serving gateway (206) or packet gateway (210). In one embodiment, the serving gateway (206) and packet gateway (210) may comprise single or separate devices. In general, the serving gateway (206) routes and forwards user data packets while also acting as the mobility anchor for the user plane during access point handovers and as the anchor for mobility between different network technologies. For idle state UE (102), the serving gateway (206) terminates the downlink data path and triggers paging when downlink data arrives for the UE (102). The serving gateway (206) manages and stores UE (102) contexts, e.g., parameters of the IP bearer service, network internal routing information. In a 5G network, the serving gateway (206) may be implemented by an SMF. In a 4G network, the serving gateway (206) may be implemented by an S-GW.

The serving gateway (206) is communicatively coupled to a packet gateway (210). In general, the packet gateway (210) provides connectivity from the UE (102) to external packet data networks (PDNs) such as data network (108) by being the point of exit and entry of traffic to external networks (e.g., 108). UE (102) may have simultaneous connectivity with more than one packet gateway (210) for accessing multiple packet data networks. The packet gateway (210) performs policy enforcement, packet filtering for each user, charging support, lawful interception, and packet screening. In the illustrated embodiment, the packet gateway (210) also limits access to endpoints such as external device (212). In a 5G network, the packet gateway (210) may be implemented by a UPF. In a 4G network, the packet gateway (210) may be implemented by a P-GW.

In the illustrated embodiment, an external device (212) is communicatively coupled to the core network via the data network (108). In one embodiment, the data network (108) may comprise the Internet. In the illustrated embodiment, the external device (212), such as an application server, may comprise any electronic device capable of communicating with the data network (108) and the disclosure is not limited to specific types of network devices.

As discussed, in some embodiments, UE (102) may alternatively connect to multiple access points (202) in a dual-connectivity arrangement. In this embodiment, such a UE (102) will have multiple data paths through the core network and control and user plane separation (CUPS) may be used to route control and user data traffic.

Figure 3:
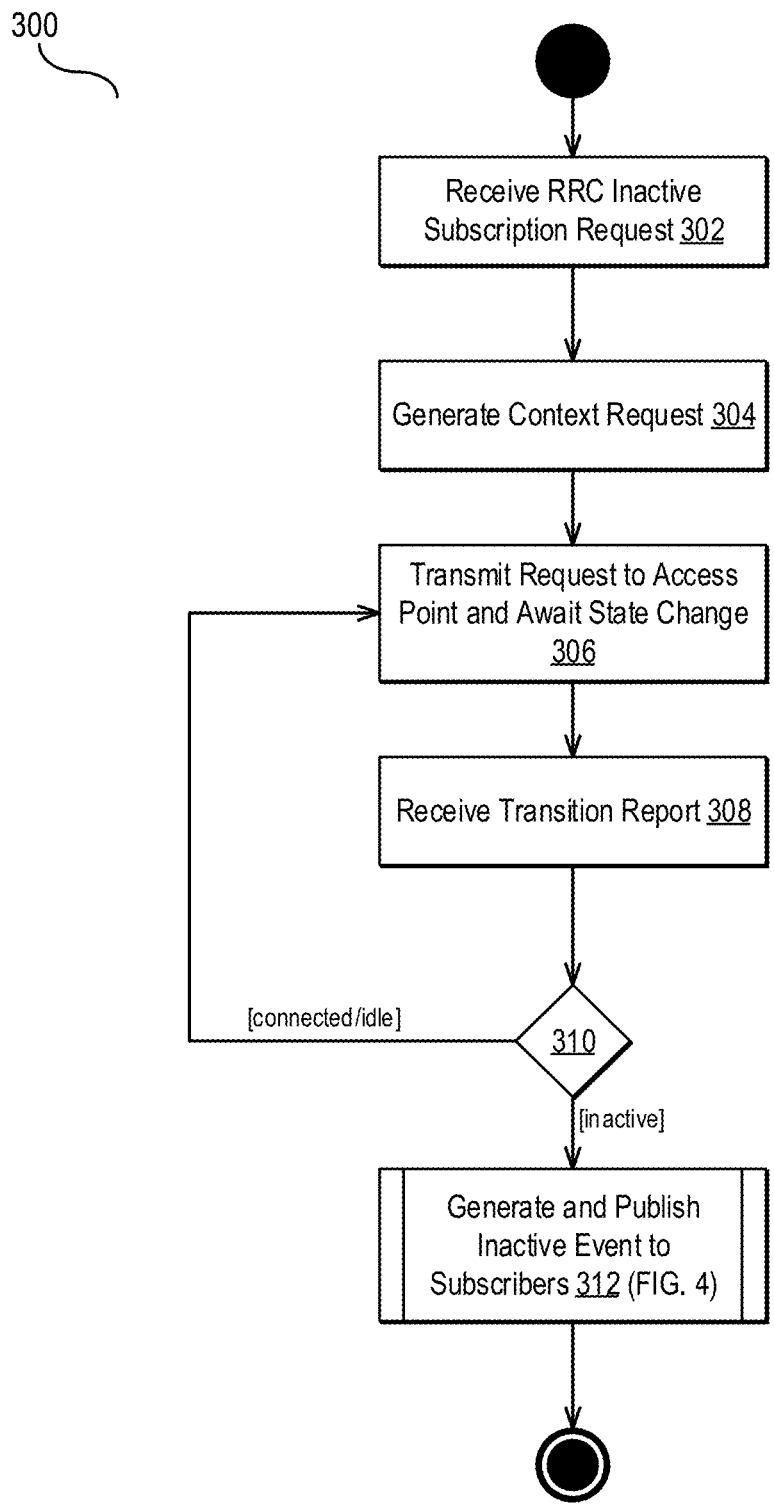
FIG. 3 is a flow diagram illustrating a method for providing a Radio Resource Control (RRC) inactive state subscription according to some embodiments of the disclosure.

FIG. 3 is a flow diagram illustrating a method for providing an RRC inactive state subscription according to some embodiments of the disclosure.

In step 302, the method (300) may comprise receiving a subscription request. In one embodiment, the subscription request comprises an RRC inactive subscription request. In one embodiment, the method (300) receives the subscription request from a session management device. In one embodiment, the session management device may comprise an SMF of a 5G core network.

In one embodiment, a mobility manager may execute the method (300). In one embodiment, the mobility manager may comprise an AMF of a 5G core network. In one embodiment, the method (300) may receive the subscription request via a Namf interface in a 5G network. In one embodiment, the Namf may comprise an interface on a service-based interface (SBI) message bus of the 5G core network. In one embodiment, the method (300) may listen to events via an application programming interface (API). In one embodiment, this API may comprise a Namf_EventExposure service in a 5G network. In one embodiment, the method (300) may receive the request via a Subscribe operation on the Namf_EventExposure service. In one embodiment, a calling party may issue a network request to the API. In one embodiment, the calling party may comprise an SMF. Alternatively, or in conjunction with the foregoing, the calling party may comprise a NEF, PCF, UDM, or another mobility manager (e.g., AMF). In one embodiment, the network request may comprise a Hypertext Transfer Protocol (HTTP) request. In one embodiment, the HTTP request may comprise an HTTP/2 request.

In one embodiment, the calling party may request the creation of a new subscription via the subscription request. In one embodiment, the subscription request may include an event type parameter. In one embodiment, the event type parameter may be set to request an RRC Inactive Status value (e.g., the identifier "RRC_Inactive_Status"). In some embodiments, the request may also include a network function (NF) identifier (NF-ID). In some embodiments, the request may include a uniform resource identifier (URI) that the method (300) may use to determine where to transmit published events. In one embodiment, the request may also include a UE identifier (e.g., via an IMSI (International Mobile Subscriber Identity) or SUPI (Subscription Permanent Identifier)), an identifier of a group of UEs (e.g., identified via a group identity), or an indication of any UE as matching the subscription (e.g., identified using a flag such as "anyUE"). In some embodiments, the request may also indicate whether the subscription is one-time only or is continuous. In the illustrated embodiment, the subscription request may conform to a standard (e.g., 3GPP TS 29.518), and thus may include additional fields. Certainly, the method (300) may also process other types of subscriptions (e.g., Location Report, Registration State Report, Connectivity State Report, 5GS User State Report, etc.), and the illustrated RRC Inactive subscription may comprise one of many subscriptions handled by the method (300).

In one embodiment, the subscription request may include an identification of one or more UEs. In some embodiments, the subscription request may only capture connected UEs while in other embodiments (or in addition) the subscription request may request UEs connected to the network in the future. For each UE known to the network, the method (300) may determine that a modification of a context of the UE is needed. Alternatively, the method (300) may generate a new context for each UE connecting to the network after the method (300) executes step 302.

In step 304, the method (300) may generate a context request message to transmit to a base station.

In one embodiment, the method (300) may determine whether a new UE context needs to be initialized or whether an existing UE context needs modification. In the former, the method (300) may generate an initial context setup request message. In the latter, the method (300) may generate a context modification request message.

In one embodiment, an initial context setup request message may be sent each time a UE connects to the mobile network. In this embodiment, the context request message may be sent by an AMF to request the setup of a UE context. In some embodiments, a context modification request message may be sent to modify the context for existing UEs connected to the network. In this embodiment, the message may be sent by the AMF to provide UE context information changes to the NG-RAN node.

In step 306, the method (300) may transmit the context request to a base station and await an RRC state change.

In one embodiment, the method (300) may await a confirmation message responsive to the context request. For example, the method (300) may await an initial context setup response message returned in response to an initial context setup request message. As another example, the method (300) may await a UE context modification response message from the base station in response to the context modification request message.

As discussed above, the context message may include a flag or other indicator to request that the base station forwards status updates when a UE is entering an RRC Inactive state. In some embodiments, the base station may store the indicator in the UE context maintained at the base station. In some embodiments, the UE may manage its state transitions and upon detecting a period of inactivity, transition the UE to an RRC Inactive state. The UE may then transmit an RRC suspend request to the base station which indicates the state change to RRC Inactive at the base station.

Upon detecting that a UE has requested suspension and a state change to RRC Inactive, the base station may generate and transmit an RRC Inactive transition report. In one embodiment, the RRC Inactive transition report may comprise a message including the state of the UE. In one embodiment, the state of the UE may comprise either a connected or inactive state. In this embodiment, the RRC Inactive transition report can indicate that a UE is entering RRC Inactive state (when indicated as inactive) or is exiting the RRC Inactive state (when indicated as connected). In some embodiments, the RRC Inactive transition report further includes an identity of the UE (e.g., IMSI, SUPI, etc.).

In step 308, the method (300) may receive the RRC Inactive transition report. In the illustrated embodiment, the method (300) may receive the RRC Inactive transition report from a base station (e.g., a gNodeB). In this embodiment, a mobility manager (e.g., AMF) may execute the method (300).

In step 310, the method (300) determines whether the RRC Inactive transition report indicates that the UE is entering an RRC Inactive state. In one embodiment, as discussed above, the RRC Inactive transition report may indicate two transitions: into and out of RRC Inactive state. Thus, when a UE is exiting an RRC Inactive state, the RRC Inactive transition report may indicate a connected state. If so, the method (300) may publish this transition (not illustrated) and continue to await further state changes in step 306.

Figure 4:
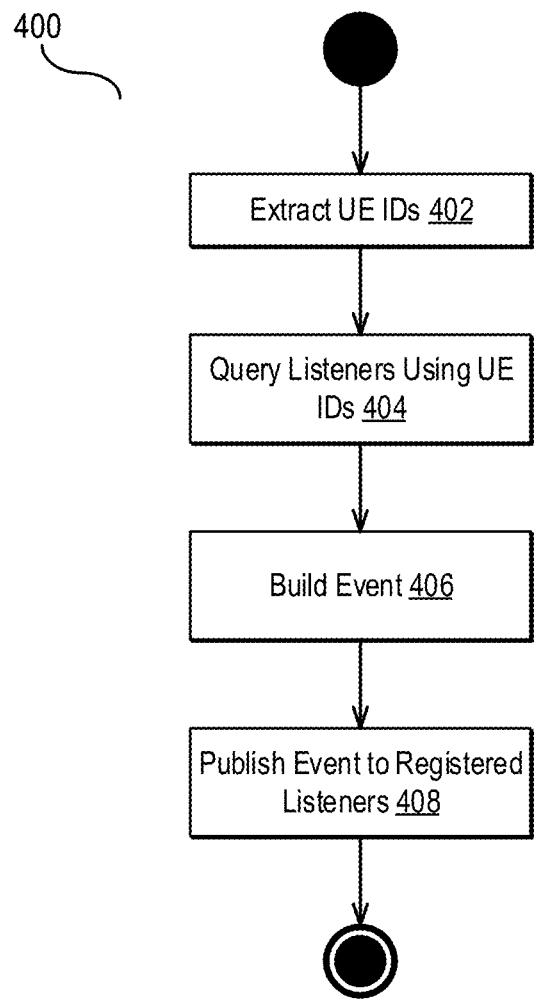
FIG. 4 is a flow diagram illustrating a method for publishing an RRC Inactive state change according to some embodiments of the disclosure.

Alternatively, if the method (300) determines that the RRC Inactive transition report indicates that a UE is transitioning to an RRC Inactive state, the method (300) may generate and publish an inactive event to subscribers, as described in more detail in FIG. 4.

FIG. 4 is a flow diagram illustrating a method 400 for publishing an RRC Inactive state change according to some embodiments of the disclosure.

In step 402, the method (400) extracts UE ID(s) from the RRC Inactive transition report.

In one embodiment, the RRC Inactive transition report may include a single UE ID. In other embodiments, the RRC Inactive transition report may include multiple UE IDs. In either event, the method (400) extracts these UE ID values from the RRC Inactive transition report.

In step 404, the method (400) queries for listeners based on the UE identifiers.

As discussed above, a mobility manager (e.g., AMF) may store a mapping of UE identifiers to listeners. For example, each time a computing device issues a subscription request, it may indicate one or more UE IDs to subscribe to. In this example, the mobility manager will maintain a table that maps the UE IDs to a URI defined in the subscription request. Certainly, a single UE ID may be associated with multiple URIs associated with respective endpoints. Thus, by querying such a table, the method (400) can identify a set of endpoints that have requested push events of RRC Inactive state changes based on the corresponding subscription requests. In some embodiments, the subscription request may request an event when any UE changes its state to RRC Inactive ("anyUE"). In this scenario, the method (400) may always include such an endpoint in step 404 and bypass querying for that specific endpoint.

In step 406, the method (400) builds an event for the RRC Inactive transition report. In one embodiment, the method (400) may build the event by combining the UE ID(s) and their corresponding states into a single information element (IE). In another embodiment, the method (400) may build an event by generation a JavaScript Object Notation (JSON)

payload. In this embodiment, the payload may include a UE ID key, type key, and an event information key. In this embodiment, the UE ID key may be associated with the value of a UE, the type key may be associated with a value of RRC Inactive Status, and the event information key may be associated with a value of either connected or inactive. In one embodiment, the method (400) may generate a single event for each UE ID. Thus, if the RRC Inactive transition report contains multiple UE IDs the method (400) may generate multiple, corresponding events.

In step 408, the method (400) publishes the event to registered listeners.

In the illustrated embodiment, the method (400) issues a network request to each URI retrieved in step 404. In one embodiment, the network request may comprise an HTTP or HTTP/2 request. In one embodiment, the method (400) includes the event(s) built in step 406 in the network request. In one embodiment, each subscribing computing device listens on a designated port for the network requests. Each subscribing computing device may process the event and take further actions based on the event.

In some embodiments, the method (400) may be executed in a one-time mode for a given subscriber. In some embodiments, a subscribing computing device may create a subscription that is only executed once. Thus, upon completing step 408, the method (400) may remove the subscription from the mapping queried in step 404 and thus cease transmitting future events to the particular subscribing computer device. By contrast, another subscribing computing device may create a subscription that is continuous. In this scenario, the methods (300, 400) may continuously be executed for each UE identified in the subscription request and for each corresponding state change.

In the foregoing embodiments, a UEs transition to an RRC Inactive state can thus be shared with other devices in a core network and is not limited to only being processed by a mobility manager. Further, the foregoing embodiments may be implemented in accordance with existing event exposure standards, thus allowing for a seamless rollout in an existing core network.

Figure 5:
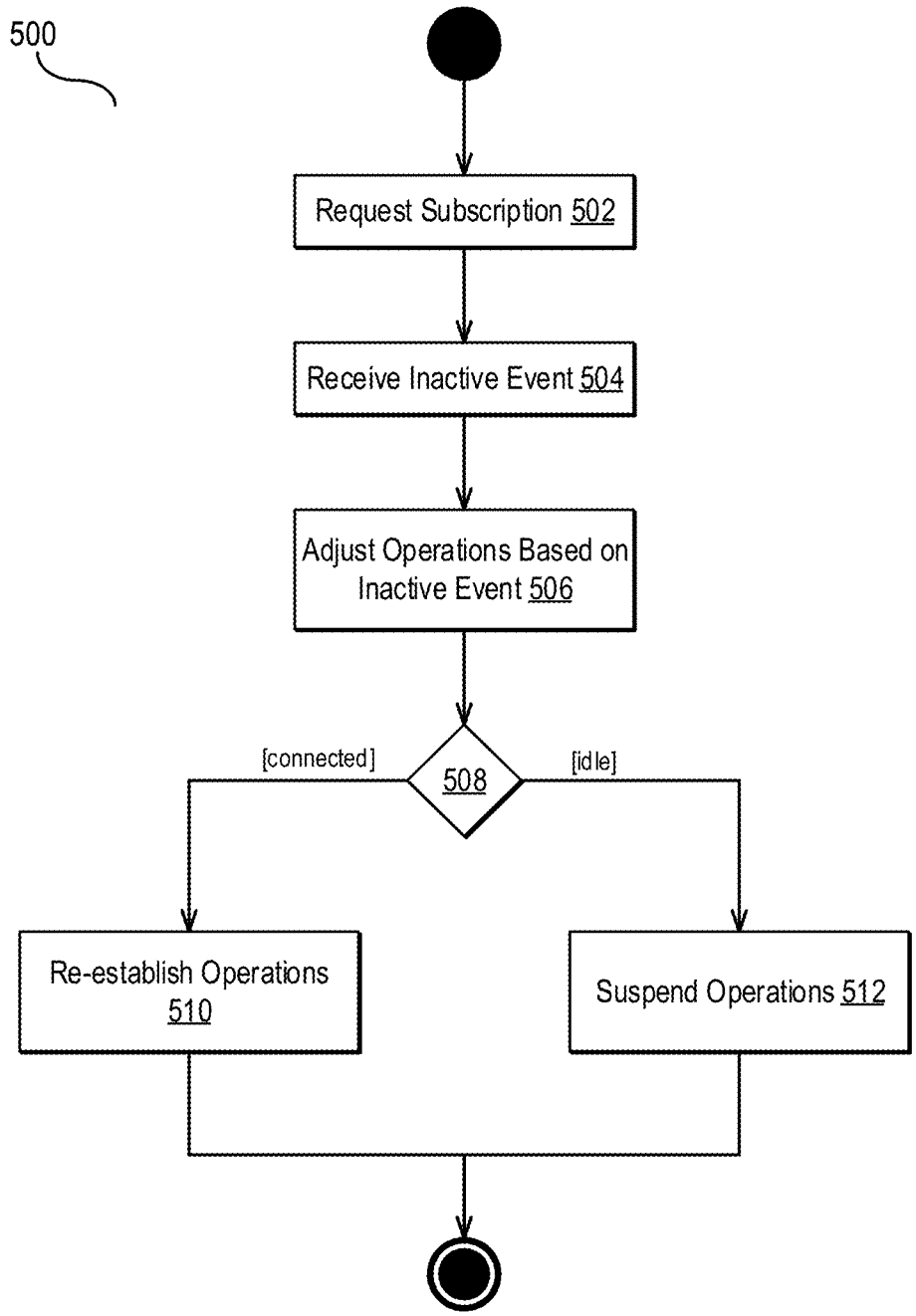
FIG. 5 is a flow diagram illustrating a method for responding to a subscribed event notification according to some embodiments of the disclosure.

FIG. 5 is a flow diagram illustrating a method 500 for responding to a subscribed event notification according to some embodiments of the disclosure.

In the illustrated embodiment, a device executing the method (500) can adjust its operations based on a received event. The disclosed embodiments are not limited to specific devices, and various devices of a core network may implement the method (500). For example, a NEF, PCF, UDM, AMF, or SMF may all execute the method (500). In some embodiments, steps 502 and 504 may be performed identically for each calling device while step 506 may vary for various devices based on the needs to the core network. Examples of such variations are provided herein.

In step 502, the method (500) requests a subscription. In one embodiment, requesting a subscription comprises generating a subscription request and transmitting the subscription request to a mobility manager (e.g., an AMF). The description of step 302 describes details of a subscription request, and those details are not repeated herein. In brief, the subscription request may indicate one or more UE to monitor for RRC Inactive state changes and may specify an identifier of the calling device and a designated endpoint.

In step 504, the method (500) receives an event. In the illustrated embodiment, step 504 may be performed asynchronously. That is, in some embodiments, the method (500) may receive a confirmation that the subscription was successfully created (not illustrated) and may execute step 504 in an event-driven fashion in response to RRC Inactive state changes. In one embodiment, the method (500) creates an endpoint (e.g., a server associated with a URI) and listens for events. A mobility manager (e.g., AMF) may transmit events by issuing requests to the endpoint. Thus, the method (500) may comprise listening for events in a given network port. In one embodiment, the event may include a listing of one or more UE IDs and corresponding state values (e.g., RRC Inactive or RRC Connected) for each UE.

In step 506, the method (500) adjusts the operations of a core network device based on the event. In general, the device executing the method (500) may comprise a device in a core network responsible for a defined functionality of the core network. In response to receiving state change data in the event, the device receiving the event may adjust the functionality based on the changing states of UEs. Thus, the method (500) may allow for dynamic adjustment of a UEs connection with the core network based on the state change data reflected in the event. In step 508, after adjusting operations in response to the determination of an RRC Inactive state, the method (500) may determine if a subsequent state change was received and may further determine if the UE has transitioned to an RRC Connected or RRC Idle state. If the method (500) determines that the UE has transitioned back to an RRC Connected state, the method (500) may re-establish operations in step 510. Conversely, if the method (500) determines that the UE has transitioned to an RRC Idle state, the method (500) may fully pause operations in step 512. Thus, in step 506, the method (500) temporarily suspends or adjusts operations to await a further state change in step 508 wherein the method (500) may proceed to either fully pause (step 512) or fully resume (step 510) operations.

Specific, non-limiting examples of executing steps 506 through 512 are provided herein.

In one embodiment, the method (500) may be executed by a PCF in a 5G network or a Policy and Charging Rules Function (PCRF) in a 4G network, alone or in combination with a mobility manager. In either embodiment, the PCF or PCRF may be responsible for defining, inter alia, the quality of service (QoS) parameters of a UE session. In some embodiments, the PCF/PCRF routes QoS policies through a mobility manager or session gateway. For example, in a 5G network, the PCF may transmit Policy Charging Control (PCC) data to an SMF, the SMF, in turn, sending Service Data Flow (SDF) templates to a packet router (e.g., UPF). Simultaneously, the SMF may communicate with an AMF to transmit QoS profiles to the RAN and QoS rules ultimately to the UE. The SDF templates and QoS profiles define how data ultimately reaches the UE. In one embodiment, the PCF/PCRF may receive the event notification in step 506 and determine that a given UE is entering RRC Inactive state. In some embodiments, the SMF may receive the event and forward the event to the PCF/PCRF. In response, the PCF/PCRF may adjust the QoS associated with the UE to, for example, buffer all user plane data traffic. The PCF/PCRF may enact this change by transmitting an updated set of PCC rules to the SMF, which propagates the changes to the UPF (effectively disabling data packet routing over the N3 interface to the RAN). The SMF may also cause the AMF to update QoS settings to the RAN and UE via the control plane signaling path.

In this example above, the PCF/PCRF is alerted to the state change to RRC Inactive and can adjust its operations accordingly. This change may be critical in a dual connectivity network. Specifically, in some embodiments, when the embodiments detect a change to RRC Inactive (e.g., in step 310), the AMF may end dual connectivity functionality (including one of two N3 interface connections between the UPF and RAN). However, since the UPF does not interface with the AMF and only interfaces with the SMF over an N4 interface, the UPF is unaware of state change. Further, since in existing networks, the state change is not accessible outside of the RAN and AMF, the user plane network functions, as a whole, are unable to handle such a state change. Thus, from the perspective of the user plane network functions, a UE in RRC Inactive state is treated equally to a UE in RRC Connected state. Thus, without the above solution, a UPF may still route data traffic to a UE in an RRC Inactive state via the remaining N3 interface. As a result, the RAN will attempt to page the UE, effectively bringing the UE out of an RRC Inactive state which wastes resources of the network when the UE is inactive. By creating an event subscription for the RRC Inactive state change, the UPF can effectively "pause" user data traffic via the QoS policies and SDF templates. This will allow the UE time to either transition to an RRC Idle state in which the UPF will suspend data traffic permanently or back to an RRC Connected state, in which the UPF will resume user plane data traffic.

As another example, a short message service (SMS) gateway may receive the event subscription in step 504. In some embodiments, the SMS gateway may comprise a Short Message Service Function (SMSF) in a 5G network or an SMS-GW3 device in an LTE network. The SMS gateway may support the transfer of SMS over non-access stratum (NAS). In this capacity, the SMS gateway may conduct subscription checking and perform a relay function between the device and, in a 5G network, the SMSC (Short Message Service Center), through interaction with the mobility manager. Upon receiving the event in step 504, the SMS gateway may pause the delivery of incoming SMS messages for a UE identified in step 504 entirely until receiving a subsequent notification that the UE has transitioned to an RRC Connected state. In other embodiments, the SMS gateway may triage incoming SMS messages and buffer non-critical messages while allowing critical SMS messages to be transmitted to the UE. In this scenario, the UE may stay in an RRC Inactive state but may be transitioned to an RRC Connected state upon receipt of a critical SMS. In some embodiments, the SMS messages will include a priority indication to enable the filtering of critical versus non-critical messages. If the UE transitions to an RRC Idle state, the SMS gateway may fully suspend all messages (or may maintain the triaging) while if the UE transitions back to an RRC Connected state, the SMS gateway may resume SMS delivery as normal.

As another embodiment, a core network may support non-IP data delivery (NIDD) services wherein data is transmitted outside the user data plane. NIDD may be utilized for short bursts of data that benefit from avoiding the establishment of a user plane data session. In a 5G network, NIDD is managed by a NEF, while in an LTE network it may be managed by a Service Capability Exposure Function (SCEF). In the illustrated embodiment, a NEF/SCEF may receive the event in step 504 indicating that a given UE is entering the RRC Inactive state. In response, in step 506, the NEF/SCEF may stop transmitting data via NIDD and pause until receiving a state change If the UE transitions to an RRC Idle state, the NEF/SCEF may fully suspend all NIDD while if the UE transitions back to an RRC Connected state, the NEF/SCEF may fully resume NIDD as normal.

Figure 6:
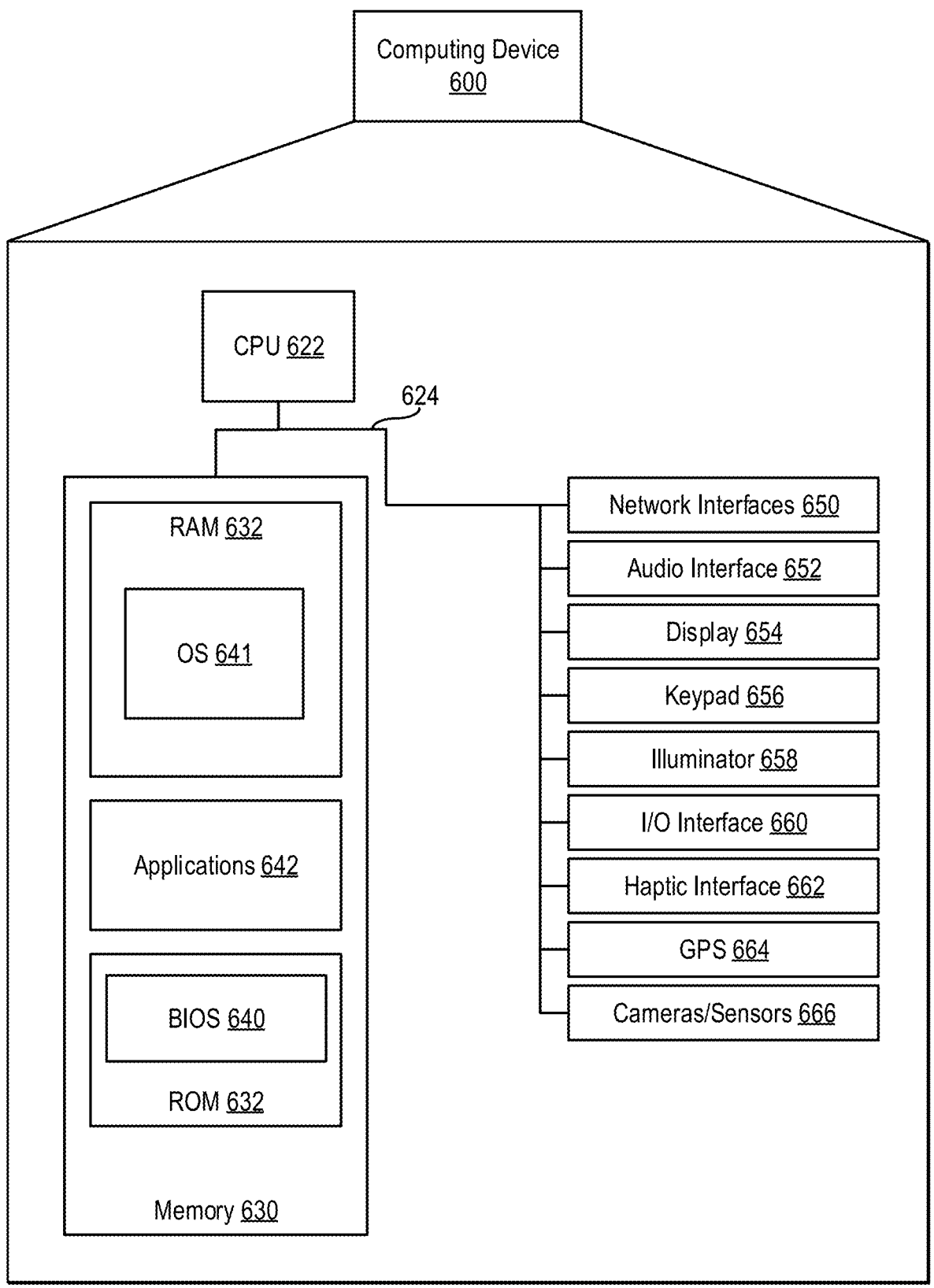
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device (600) may include more or fewer components than those shown in FIG. 6, depending on the deployment or usage of the device (600). For example, a server computing device, such as a rack-mounted server, may not include an audio interface (652), display (654), keypad (656), illuminator (658), haptic interface (662), Global Positioning Service (GPS) receiver (664), or cameras/sensor (666). Some devices may include additional components not shown, such as graphics processing unit (GPU) devices, cryptographic co-processors, artificial intelligence (AI) accelerators, or other peripheral devices.

As shown in the figure, the device (600) includes a central processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666) or a plurality of cameras/sensors (666). The positioning of the camera(s)/sensor(s) (666) on the device (600) can change per device (600) model, per device (600) capabilities, and the like, or some combination thereof.

In some embodiments, the CPU (622) may comprise a general-purpose CPU. The CPU (622) may comprise a single-core or multiple-core CPU. The CPU (622) may comprise a system-on-a-chip (SoC) or a similar embedded system. In some embodiments, a GPU may be used in place of, or in combination with, a CPU (622). Mass memory (630) may comprise a dynamic random-access memory (DRAM) device, a static random-access memory device (SRAM), or a Flash (e.g., NAND Flash) memory device. In some embodiments, mass memory (630) may comprise a combination of such memory types. In one embodiment, the bus (624) may comprise a Peripheral Component Interconnect Express (PCIe) bus. In some embodiments, the bus (624) may comprise multiple busses instead of a single bus.

Mass memory (630) illustrates another example of computer storage media for the storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600)

Applications (642) may include computer-executable instructions which, when executed by the computing device (600), perform any of the methods (or portions of the methods) described previously in the description of the preceding Figures. In some embodiments, the software or programs implementing the method embodiments can be read from a hard disk drive (not illustrated) and temporarily stored in RAM (632) by CPU (622). CPU (622) may then read the software or data from RAM (632), process them, and store them to RAM (632) again.

The computing device (600) may optionally communicate with a base station (not shown) or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises an input/output interface (660) for communicating with external devices, using communication technologies, such as USB, infrared, Bluetooth™, or the like. The haptic interface (662) provides tactile feedback to a user of the client device.

The optional GPS receiver (664) can determine the physical coordinates of the computing device (600) on the surface of the Earth, which typically outputs a location as latitude and longitude values. GPS receiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
receiving, by a processor, a subscription request from a computing device, the subscription request including a radio resource control (RRC) inactive state status subscription type;
receiving, by the processor, a transition report indicating that a user equipment (UE) has entered an RRC inactive state;
identifying, by the processor, a set of listeners using an identifier of the UE, the set of listeners including the computing device;
generating, by the processor, an event responsive to the transition report, the event including data representing the RRC inactive state and an identifier of the UE; and
publishing, by the processor, the event to the set of listeners.

2. The method of claim 1, wherein receiving the subscription request comprises receiving the subscription request from a gateway.

3. The method of claim 2, wherein the gateway comprises a Session Management Function (SMF).

4. The method of claim 1, wherein receiving the subscription request comprises receiving the subscription request via a Namf_EventExposure service.

5. The method of claim 1, further comprising issuing a context request to a base station prior to receiving the transition report, the context request comprising a request to be notified of RRC state changes.

6. The method of claim 5, wherein the context request comprises a request selected from an initial context setup request or a context modification request.

7. The method of claim 1, wherein publishing the event to the computing device comprises transmitting the event to a device implementing a network function selected from one of the following: a Network Exposure Function (NEF), a Policy Control Function (PCF), a Unified Data Management (UDM) Function, an SMF, or an Access and Mobility Management Function (AMF).

8. A non-transitory computer-readable storage medium for storing instructions capable of being executed by a processor, the instructions defining steps of: receiving, by the processor, a subscription request from a computing device, the subscription request including a radio resource control (RRC) inactive state status subscription type;
receiving, by the processor, a transition report indicating that a user equipment (UE) has entered an RRC inactive state;
identifying, by the processor, a set of listeners using an identifier of the UE, the set of listeners including the computing device;
generating, by the processor, an event responsive to the transition report, the event including data representing the RRC inactive state and an identifier of the UE; and
publishing, by the processor, the event to the set of listeners.

9. The non-transitory computer-readable storage medium of claim 8, wherein receiving the subscription request comprises receiving the subscription request from a gateway.

10. The non-transitory computer-readable storage medium of claim 9, wherein the gateway comprises a Session Management Function (SMF).

11. The non-transitory computer-readable storage medium of claim 8, wherein receiving the subscription request comprises receiving the subscription request via a Namf_EventExposure service.

12. The non-transitory computer-readable storage medium of claim 8, wherein the instructions further include: defining a step of issuing a context request to a base station prior to receiving the transition report, the context request comprising a request to be notified of RRC state changes.

13. The non-transitory computer-readable storage medium of claim 12, wherein the context request comprises a request selected from an initial context setup request or a context modification request.

14. The non-transitory computer-readable storage medium of claim 8, wherein publishing the event to the computing device comprises transmitting the event to a device implementing a network function selected from one of the following: a Network Exposure Function (NEF), a Policy Control Function (PCF), a Unified Data Management (UDM) Function, an SMF, or an Access and Mobility Management Function (AMF).

15. A device comprising: a processor configured to:
receive a subscription request from a computing device, the subscription request including a radio resource control (RRC) inactive state status subscription type;
receive a transition report indicating that a user equipment (UE) has entered an RRC inactive state;
identify a set of listeners using an identifier of the UE, the set of listeners including the computing device;
generate an event responsive to the transition report, the event including data representing the RRC inactive state and an identifier of the UE; and
publish the event to the set of listeners.

16. The device of claim 15, wherein receiving the subscription request comprises receiving the subscription request from a gateway.

17. The device of claim 16, wherein the gateway comprises a Session Management Function (SMF).

18. The device of claim 15, wherein receiving the subscription request comprises receiving the subscription request via a Namf_EventExposure service.

19. The device of claim 15, the processor further configured to issue a context request to a base station prior to receiving the transition report, the context request comprising a request to be notified of RRC state changes.

20. The device of claim 15, wherein publishing the event to the computing device comprises transmitting the event to a device implementing a network function selected from one of the following: a Network Exposure Function (NEF), a Policy Control Function (PCF), a Unified Data Management (UDM) Function, an SMF, or an Access and Mobility Management Function (AMF).

* * * * *